(12) United States Patent
Barnes et al.

(10) Patent No.: US 9,511,729 B1
(45) Date of Patent: Dec. 6, 2016

(54) DYNAMIC RESOURCE ALLOCATION

(75) Inventors: Geoffrey J. Barnes, Cedar Rapids, IA (US); Richard G. Moore, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 959 days.

(21) Appl. No.: 12/460,700

(22) Filed: Jul. 23, 2009

(51) Int. Cl.
*G05D 1/00* (2006.01)
*B60R 16/037* (2006.01)
*B64C 13/20* (2006.01)

(52) U.S. Cl.
CPC ........... *B60R 16/0373* (2013.01); *B64C 13/20* (2013.01)

(58) Field of Classification Search
CPC ... B60R 16/0373; B64C 13/20; G04G 99/006; G07C 5/008
USPC .......................................................... 701/16
See application file for complete search history.

(56) References Cited

U.S. PATENT DOCUMENTS

| | | | |
|---|---|---|---|
| 4,797,839 A | 1/1989 | Powell | |
| 5,487,172 A * | 1/1996 | Hyatt | 712/32 |
| 5,794,224 A | 8/1998 | Yufik | |
| 5,913,912 A | 6/1999 | Nishimura | |
| 7,478,071 B2 | 1/2009 | Kadambe | |
| 7,675,852 B1 * | 3/2010 | Arundale et al. | 370/229 |
| 7,765,038 B2 * | 7/2010 | Appleby et al. | 701/23 |
| 2002/0066054 A1 * | 5/2002 | Jaw et al. | 714/48 |
| 2003/0023534 A1 | 1/2003 | Kadambe | |
| 2004/0054821 A1 | 3/2004 | Warren | |
| 2005/0187677 A1 * | 8/2005 | Walker | 701/16 |
| 2007/0038939 A1 * | 2/2007 | Challen | G05B 15/02 715/734 |
| 2008/0101078 A1 * | 5/2008 | Stokes | 362/470 |

FOREIGN PATENT DOCUMENTS

| | | |
|---|---|---|
| WO | WO/96/10793 A1 | 4/1996 |
| WO | WO/02/18874 A1 | 3/2002 |
| WO | WO/02/101594 A2 | 12/2002 |
| WO | WO/03/040653 A1 | 5/2003 |

* cited by examiner

*Primary Examiner* — Redhwan K Mawari
(74) *Attorney, Agent, or Firm* — Simmons Perrine Moyer Bergman PLC

(57) ABSTRACT

The present invention includes systems and methods for dynamic allocation of computing resources. Computing resources on an aircraft are divided amongst several avionics applications that are responsible for controlling sub-systems on the aircraft (e.g. the navigation system). A resource manager assigns computing resources (e.g. processor cycles) to individual applications based on the present condition of the aircraft and then instructs the throttling mechanisms to allocate the computing resources among the applications. The resource manager determines the aircraft condition by correlating inputs from the aircraft to a set of rules stored in a condition table. The resource manager then determines the computing resource allocation by correlating the aircraft condition to a set of resource allocations stored in an allocation table.

9 Claims, 2 Drawing Sheets

DYNAMIC RESOURCE ALLOCATION

FIELD OF THE INVENTION

The present invention relates to the dynamic allocation of computing resources based upon current conditions.

BACKGROUND OF THE INVENTION

Sophisticated computer systems are required for almost every aspect of safely or comfortably operating an aircraft, as well as other transportation and cargo vehicles. Traditionally, each computer system relied on its own hardware and software to accomplish its functionality. The allocation of computing resources is static because with separate systems, there is no way to share computing resources. As concerns about the cost of fuel and the environment have grown, the ubiquitous challenge of weight reduction has taken on increased importance. Consolidating computer systems to use common hardware has the desired effect of reducing the amount of weight attributable to computers while allowing the sharing of computing resources. However, allocating of the common computing resources has until now been static. Meaning that each aviation electronics (avionics) application is allocated a certain amount of computing resources when that application is added to the system. Static allocation is done because of the need to provide burst capacity for an application. Namely, computing resources are allocated to an application based on the maximum predicted amount of computing resources that the application will need in the future. This static allocation results in overcapacity because all applications do not use all of their allocated resources all of the time. Rather some applications are quiescent for periods of time followed by a burst of activity depending on the operating conditions at the time, while other applications use a consistent, if moderate amount of their allocated resources all of the time.

The present invention overcomes one or more of these problems.

SUMMARY OF THE INVENTION

The present invention includes systems and methods for dynamic allocation of computing resources. Computing resources on an aircraft are divided amongst several avionics applications that are responsible for controlling sub-systems on the aircraft (e.g. the navigation system). A resource manager assigns computing resources (e.g. processor cycles) to individual applications based on the present condition of the aircraft and then instructs the throttling mechanisms to allocate the computing resources among the applications. The resource manager determines the aircraft condition by correlating inputs from the aircraft to a set of rules stored in a condition table. The resource manager then determines the computing resource allocation by correlating the aircraft condition to a set of resource allocations stored in an allocation table.

DETAILED DESCRIPTION

The present invention includes systems and methods for the dynamic allocation of computing resources on an aircraft. Dynamic resource allocation permits the reduction in the amount of overcapacity in the computer systems of an aircraft. By dynamically allocating airborne computing resources, each application is given only the resources that it needs at that moment. In this way, the total amount of computing resources needed in an aircraft is reduced because the average usage by all the computing systems is lower than the peak usage. Some overcapacity may still need to be build into the system, but the overcapacity will be comparatively smaller.

Put another way, by sharing computing resources among several avionics applications, a smaller total amount of computing resources is needed. This in turn leads to a reduction the weight dedicated to computing resources.

Resource allocation is determined for each avionics application in each operating condition that the aircraft will experience during normal and abnormal flight environments. These allocations are maintained and tested externally to the aircraft electronics and provided as tables or similar data structures with the network operating system.

Figure 1:
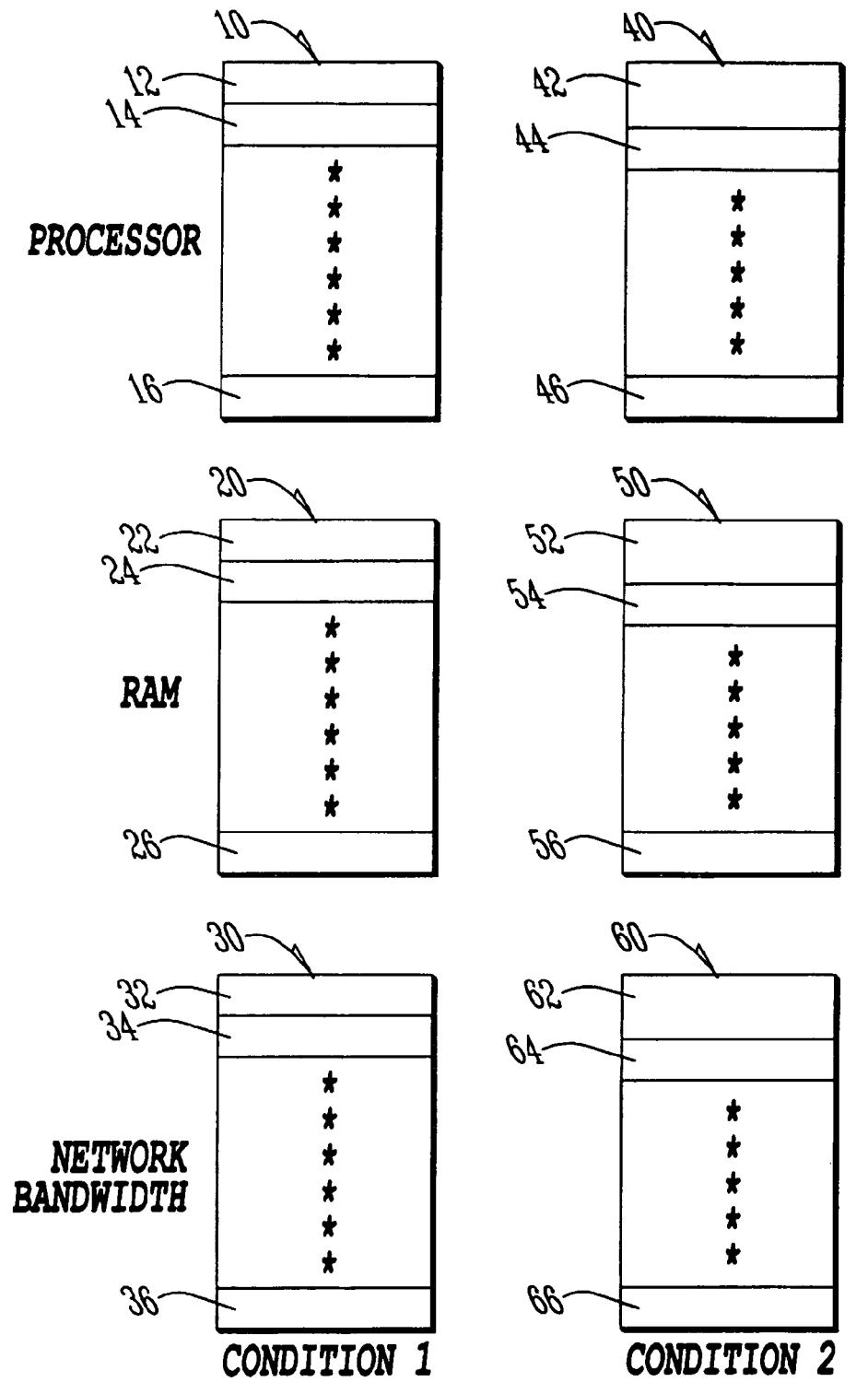
FIG. 1 shows an allocation of computing resources.

Dynamic resource allocation involves changing the amount of computing resources that an avionics application has available to it based on the present condition of the aircraft. At any given moment, the computing resources of the aircraft are divided amongst several avionics applications. In FIG. 1, block 10 represents the number of processor cycles allocated to each of applications 1 to N under aircraft condition 1, referenced by numerals 12, 14 and 16, respectively. Block 20 represents the amount of RAM allocated to each of applications 1 to N under aircraft condition 1, referenced by numerals 22, 24 and 26, respectively. Block 30 represents the amount of network bandwidth allocated to each of applications 1 to N under aircraft condition 1, referenced by numerals 32, 34 and 36, respectively. When the aircraft condition changes, a new allocation of computing resources is carried out.

Block 40 represents the number of processor cycles allocated to each of applications 1 to N under aircraft condition 2, referenced by numerals 42, 44 and 46, respectively. Block 50 represents the amount of RAM allocated to each of applications 1 to N under aircraft condition 2, referenced by numerals 52, 54 and 56, respectively. Block 60 represents the amount of network bandwidth allocated to each of applications 1 to N under aircraft condition 2, referenced by numerals 62, 64 and 66, respectively. As can be seen the relative number of processor cycles allocated to application 1 has increased between aircraft condition 1 (reference numeral 12) and aircraft condition 2 (reference numeral 42). Similar increases occurred in the amount of RAM (reference numeral 52) and network bandwidth (reference numeral 62) dedicated to application 1.

Similarly, the amount of processor cycles, RAM and network bandwidth dedicated to application 2 have decreased in the change from aircraft condition 1 (reference numerals 14, 24 and 34) to aircraft condition 2 (reference numerals 44, 54 and 64). For any given change in aircraft condition, some or all of the applications may have their allocated computing resources changed, held steady or eliminated.

The computing resources on the aircraft support some or all of the avionics applications that control the various systems on the aircraft. The computing resources include general purpose computer hardware including processing units (e.g. CPUs, GPUs), cache, memory, storage, various buses that connect these components, as well as networking hardware to provide data links to other computers, whether inside or outside the aircraft. Each of the hardware components represents a finite amount of resources that are to be allocated amongst the applications. For example, CPUs and GPUs have a limited number of processor cycles and processor throughput, while cache, memory, intermediate storage, display fields and storage are limited in size. Bus bandwidth and network bandwidth are also finite resources to be allocated.

An avionics applications are software programs that run on the common computing platform with each application controlling one of a variety of different systems on the aircraft. Exemplary systems include the navigation systems, flight control systems, emergency systems, data recording and reporting systems, climate control systems, entertainment systems, etc. It is contemplated that avionics applications may have overlapping responsibility in that one application may control several systems or several applications may have responsibility for one system.

Aircraft condition represents the present state of the aircraft. The aircraft condition takes into account at least one of the following situations that occur on an aircraft: flight stage, flight conditions, maintenance activities, application priority, crew status, the occurrence of an emergency, aircraft configuration, system failures or faults, and the occurrence of an incident, plus a default fallback state for an undefined condition. Flight stage refers to pre-flight, takeoff, in-flight, landing and post-flight, where it is desirable to allocated computing resources differently base on the flight stage. Flight conditions refer to the current weather conditions (e.g. precipitation, temperature, wind direction, visibility, ceiling, etc.), time of day, existence of turbulence, etc. Maintenance activities refer to completed or scheduled maintenance activities, as well as any error codes or problems issued by hardware or software on the aircraft. Also, the operation of the aircraft generates a large of data that is logged for later examination. This examination is necessary to provide proper maintenance. While low priority, this data examination can be completed while the aircraft is still in-flight. This increase the time the aircraft is in service because the data examination will not delay the completion of ground maintenance.

Application priority refers to a ranking of the importance of each of the avionics applications on the aircraft. For example, the navigation system and its application probably will always be more important than the in-flight entertainment system. Crew status refers to number and availability of the flight crew. On extended flights, members of the crew will take breaks to insure that they remain rested and alert. This may alter the amount of resources a computing system needs; e.g. with fewer people in the cockpit, more responsibilities may be off loaded onto the computing system. Emergencies include passenger activities that may require a change in flight plan; e.g. a medical emergency. An incident refers to mechanical problems with the aircraft or other abnormal operations of the aircraft (e.g. a hijacking).

In addition to these situations that describe the current state of the aircraft, other situations may also be used to describe the current state of the aircraft. Moreover, the aircraft condition is likely to be made up of a combination of these conditions. Each of these situations also may have a gradation of severity; rain is treated differently from freezing rain, which is treated differently from snow, such that each of these results in a different aircraft condition.

Figure 2:
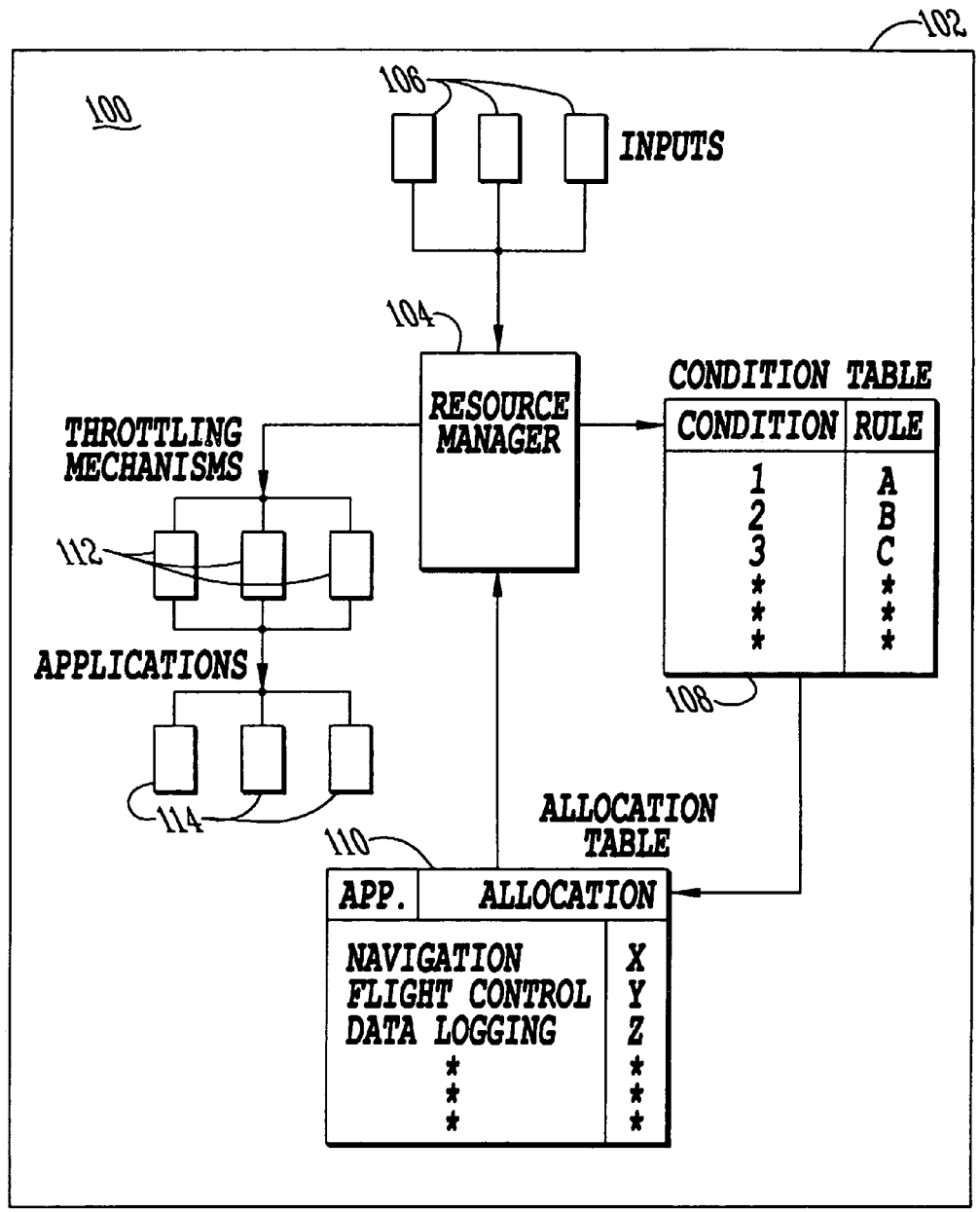
FIG. 2 shows a system for allocating computing resources.

As seen in FIG. 2, the system 100 is aboard an aircraft 102 and includes a resource manager 104, a plurality of inputs 106, a condition table 108, an allocation table 110, and one or more throttling mechanisms 112. Generally, the operation of the system is as follows. The resource manager 104 determines the aircraft condition by taking in inputs 106 and referring to the condition table 108. Based on the information stored in the condition table 108, the resource manager correlates the current aircraft condition to a set of resource allocations for each of the avionics applications 114, as stored in the allocation table 108. The resource manager than instructs the throttling mechanisms 112 to increase, decrease or hold steady the amount of computing resources dedicated to each application 114 based on the information from the allocation table.

The system itself may operate on a general purpose computer or on specialized hardware and may include any software necessary to carry out its functionality. For example a network operating system may be used to tie together all of the components of the system.

The resource manager, as the name suggests, manages the overall operation of the system to insure that computing resources are allocated efficiently and properly. As part of overall management, the resource manager determines the aircraft condition by first monitoring inputs from one or more state machines that give the present state of the various computing systems on the aircraft and/or inputs from one or more sensors on the aircraft. The resource manager does not control any of the aircraft systems; those are controlled by the various applications. Rather, the resource manager sets the amount of computing resources each application is allowed to utilize in carrying out its responsibilities. The resource manager may be a stand alone piece of software run on an operating system, it may be the operating system, or it may be integrated into a sole purpose piece of hardware.

Next, based on the received inputs, the resource manager assigns or looks up the aircraft condition in the condition table. Essentially, the condition table stores information or rules that identify the aircraft condition given the set of received inputs.

With this aircraft condition, the resource manager assigns or looks up a computing resource allocation stored in the allocation table that corresponds to the current aircraft condition.

Each computing resource allocation includes one or more upper limits on the amount of a particular computing resource that each of the applications is able to use. For example, if there are currently three avionics applications operating, the processor cycles are allocated among the three applications. Preferably, each of the computing resources (e.g. CPU, memory, storage, etc.) is allocated in each computing resource allocation.

The resource manager instructs the throttling mechanisms to implement computing resource allocations that correspond to the current aircraft condition or a default condition if the current aircraft condition doesn't match a condition in the allocation table. The throttling mechanisms may be any software or hardware device that is capable of limiting the amount of computing resources used by an application. Each computing resource may have a separate throttling mechanism, although throttling mechanisms that limit two or more computing resources are also contemplated.

The resource manager also tracks the current resource usage by each of the computing systems in the aircraft. In this way, the resource manager has a current understanding of the allocated and free resources, as well as understanding which avionics applications, based on the current aircraft condition, are not fully utilizing their allocated resources. Sufficient free resources may cause a change in the aircraft condition, causing a change in the overall computing resource allocation. Likewise, if an application is not fully utilizing it allocated resources, this may cause a change in the aircraft condition, causing a change in the computing resource allocation.

The resource manager can, of course, control its own resource allocation i.e. those computing resources dedicated to dividing up the remaining computing resources for the rest of the applications on the aircraft.

The resource manager may change the allocation of computing resources every time the aircraft condition changes, as indicated by the change in the information received from the inputs. In the alternative, the resource manager may change the computing resource allocation only at set time intervals (e.g. every 30 seconds). In another alternative, the resource manager may only change the allocation when the change in aircraft condition reaches a certain threshold; that is, the change in aircraft condition is significant enough to warrant a re-allocation of the computing resources. The decision about whether a change in the aircraft condition is significant can be done by prioritizing the aircraft conditions such that certain conditions will not have the computing resource allocation changed (e.g. emergencies during takeoff or landing), while other conditions will always be superseded (e.g. maintenance data examination).

The present invention also includes methods for dynamically allocating computing resources across the variety of avionics applications used by the aircraft. The methods include receiving state machine and sensor information inputs from around the aircraft at the resource manager. With the information inputs, the resource manager determines the aircraft condition by correlating the inputs to information stored in the condition table. Next, the resource manager determines the proper resource allocation for the aircraft condition by looking up a set of computing resource allocations that correspond to the previously identified aircraft condition. With the set of computing resource allocations, the resource manager instructs the plurality of throttling mechanisms to limit each application to its computing resource allocation.

It is contemplated that aircraft encompasses all passenger, cargo and military aircraft, whether fixed or rotary winged and include planes, jets, turboprops, helicopters and the like. Dynamic resource allocation on both manned and unmanned aircraft are contemplated.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A system, onboard an aircraft, for dynamic allocation of airborne computing resources, comprising:
    a plurality of avionics applications, each avionics application responsible for controlling one or more systems of an aircraft;
    wherein the plurality of avionics applications includes at least one avionics system chosen from:
    a system which controls the navigation systems;
    flight control system;
    climate control systems; and
    entertainment systems:
        a plurality of computing resources on an aircraft utilized by the plurality of avionics applications, where the computing resources allocate processor cycles amongst the avionics applications, for use with avionics application control tasks for said at least one avionics system;
        a resource manager, which is separate and distinct from the plurality of avionics applications, said resource manager instructs a plurality of throttling mechanisms to allocate processor cycles among the avionics applications based on an aircraft condition;
    wherein the resource manager determines the aircraft condition based on correlating a plurality of inputs from the aircraft to a plurality of rules stored in a condition table;
    wherein the resource manager determines the computing resource allocation based on correlating the aircraft condition to a plurality of resource allocations stored in an allocation table;
    wherein the plurality of inputs include a plurality of state machines, sensors and combinations thereof; and
    wherein the aircraft condition comprises flight stage, flight conditions, maintenance activities, application priority, crew status, an occurrence of an emergency, aircraft configuration, system failures or faults, an occurrence of an incident, a fallback state of an undefined condition and combinations thereof.

2. The system of claim 1 wherein the allocated computing resources comprise processing units, cache, memory, intermediate storage, display fields, storage, bus bandwidth, networking bandwidth and combinations thereof.

3. A system for dynamic allocation of computing resources, comprising:
    a plurality of avionics applications, each application responsible for controlling one or more systems of an aircraft;
wherein the plurality of avionics applications includes at least one avionics system chosen from:

a system which controls the navigation systems;
flight control system;
climate control systems; and
entertainment systems:
a plurality of computing resources on an aircraft utilized by the plurality of avionics applications, where the computing resources allocate processor cycles amongst the avionics applications, for use with avionics application control tasks for said at least one avionics system; and
a resource manager, which is separate and distinct from the plurality of avionics applications, said resource manager instructs a plurality of throttling mechanisms to allocate processor cycles among the avionics applications based on an aircraft condition.

4. The system of claim 3 wherein the resource manager determines the aircraft condition based on correlating a plurality of inputs from the aircraft to a plurality of rules stored in a condition table.

5. The system of claim 4 wherein the resource manager determines the computing resource allocation based on correlating the aircraft condition to a plurality of resource allocations stored in an allocation table.

6. The system of claim 5 wherein the plurality of inputs include a plurality of state machines, sensors and combinations thereof.

7. The system of claim 6 wherein the aircraft condition comprises flight stage, flight conditions, maintenance activities, crew status, an occurrence of an emergency, aircraft configuration, system failures or faults, an occurrence of an incident, a fallback state of an undefined condition and combinations thereof.

8. The system of claim 7 wherein the plurality of avionics applications control the navigation systems, flight control systems, emergency systems, data recording and reporting systems, climate control systems, entertainment systems and combinations thereof.

9. The system of claim 8 wherein the allocated computing resource comprise processing units, cache, memory, intermediate storage, display fields, storage, bus bandwidth, networking bandwidth and combinations thereof.

* * * * *